(12) United States Patent
Glinka et al.

(10) Patent No.: US 7,614,660 B2
(45) Date of Patent: Nov. 10, 2009

(54) BELT END FITTING DEVICE

(75) Inventors: Oliver Glinka, Ulm (DE); Alain Agret, Alfortville (FR)

(73) Assignee: Takata-Petri AG, Aschaffenburg (DE)

( * ) Notice: Subject to any disclaimer, the term of this patent is extended or adjusted under 35 U.S.C. 154(b) by 285 days.

(21) Appl. No.: 11/209,039

(22) Filed: Aug. 23, 2005

(65) Prior Publication Data
US 2006/0082125 A1 Apr. 20, 2006

(30) Foreign Application Priority Data
Aug. 26, 2004 (DE) .................. 10 2004 041 810

(51) Int. Cl.
*B60R 22/20* (2006.01)
(52) U.S. Cl. .................................. 280/801.2
(58) Field of Classification Search ............... 280/801.2
See application file for complete search history.

(56) References Cited

U.S. PATENT DOCUMENTS

| | | |
|---|---|---|
| 5,236,220 A | 8/1993 | Mills |
| 5,855,047 A * | 1/1999 | Haas .................. 24/684 |
| 6,443,487 B1 * | 9/2002 | Suyama .................. 280/733 |
| 6,581,969 B2 * | 6/2003 | Nishide .................. 280/801.1 |
| 2002/0050707 A1 | 5/2002 | Nishide |

FOREIGN PATENT DOCUMENTS

| | | |
|---|---|---|
| DE | 37 20 704 A1 | 1/1989 |
| DE | 41 41 836 C1 | 4/1993 |
| DE | 199 44 478 A1 | 3/2001 |
| DE | 200 21 223 U1 | 5/2001 |
| DE | 10 2004 046 761 A1 | 3/2006 |
| EP | 306122 A2 * | 3/1989 |
| EP | 1 283 138 A1 | 2/2003 |
| FR | 2 809 694 A1 | 12/2001 |
| JP | 04059452 A * | 2/1992 |
| JP | 5-105028 | 4/1993 |
| JP | 7-329711 | 12/1995 |
| JP | 2002-137714 | 5/2002 |

* cited by examiner

*Primary Examiner*—Faye M. Fleming
(74) *Attorney, Agent, or Firm*—Foley & Lardner LLP

(57) ABSTRACT

A pivotally or foldably mounted belt end fitting device is provided to secure a seatbelt. The belt end fitting device minimally obstructs and/or disturbs a vehicle passenger, in particular when the passenger is getting into or out of a rear seat of the vehicle.

11 Claims, 1 Drawing Sheet

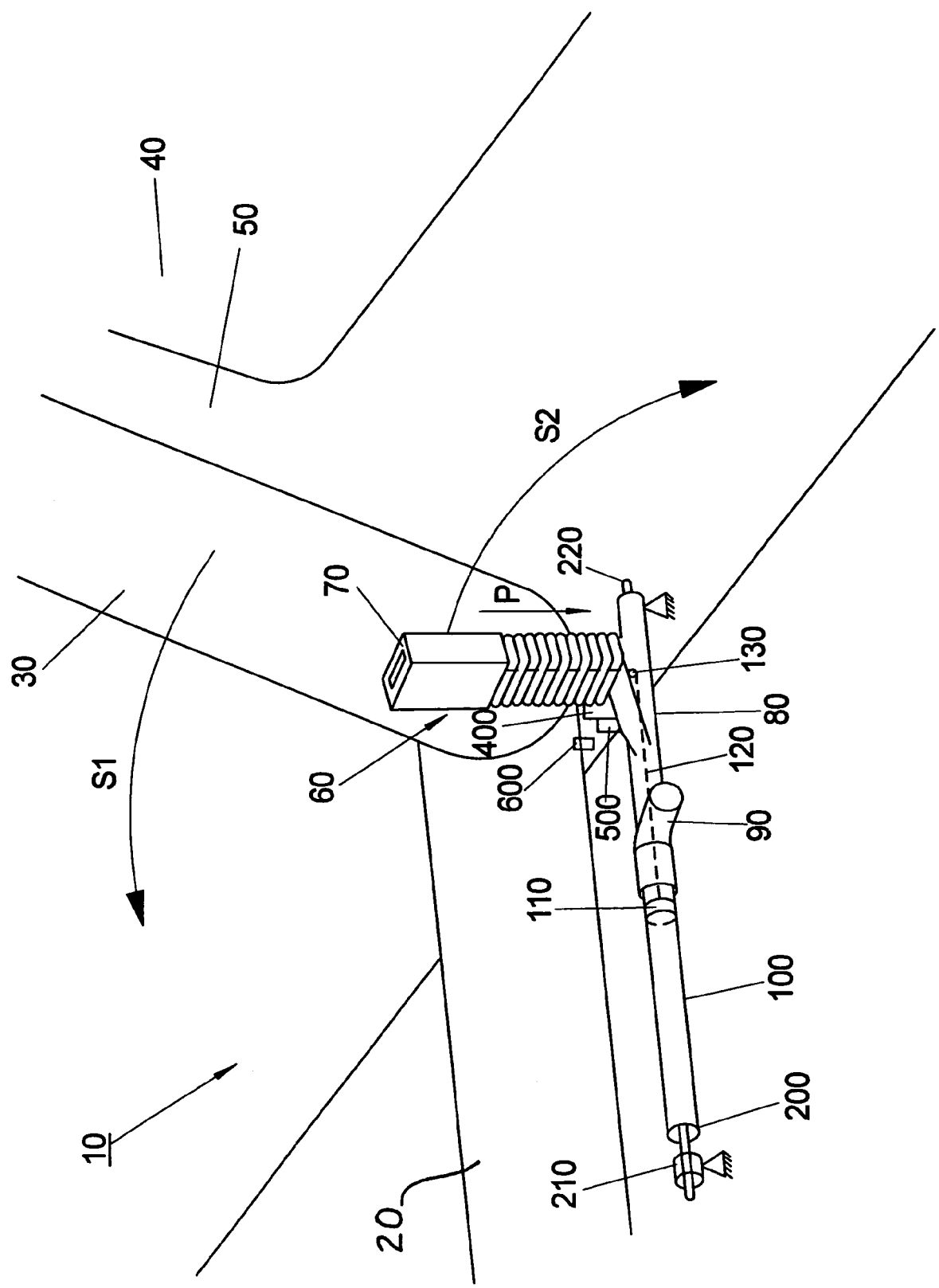

BELT END FITTING DEVICE

BACKGROUND

The present invention relates to a belt end fitting device for securing a seatbelt.

It is well known that, when getting into (when entering a vehicle) or out of (when exiting the vehicle) a rear seat or backseat bench (hereinafter "rear seat") of a three-door vehicle, a passenger must enter/exit via the front door. To facilitate this movement, the seatback of the particular front seat is typically folded forward in the direction of travel. However, as the seatbelt, which is secured to the belt end fitting device, associated with the particular front seat is permanently anchored to the vehicle floor, the seatbelt often hinders the passenger's ability to enter/exit the rear seat.

Accordingly, the present invention has been made in light of the aforementioned problem. Specifically, an object of the present invention is to provide a belt end fitting device that enables a seatbelt affixed thereto to minimally obstruct and/or disturb a vehicle passenger, in particular when the passenger is getting into or out of the vehicle.

SUMMARY

An embodiment of the invention addresses a belt end fitting device for securing a seatbelt. The belt end fitting device is pivotably or foldably mounted at a location on a vehicle body or a vehicle seat.

In a further embodiment, the belt end fitting device may be configured to pivot at the mount location from a predetermined normal position in the direction of the vehicle floor.

In another further embodiment, the belt end fitting device may be coupled in such a manner to a seatback of the vehicle seat that, when the seatback is pivoted, the belt fitting device also pivots automatically.

In another further embodiment, the pivoting movements of the belt end fitting device and that of the seatback may be in opposite directions.

In another further embodiment, the belt end fitting device and the seatback may be coupled in such a manner that, when the seatback is pivoted forward in the direction of travel, the belt end fitting device automatically pivots rearward.

In another further embodiment, the belt end fitting device may include a spring drive that exerts a pivoting force to pivot the belt end fitting device.

In another further embodiment, the spring drive may include a torsion spring.

In another further embodiment, the belt end fitting device may include a locking device that is configured to lock the belt end fitting device in its predetermined normal position and that is configured to prevent a pivoting of the belt end fitting device by the spring drive.

In another further embodiment, the locking device may be connected to a seat-side release element that is configured to unlock the locking device and that is configured to release a pivoting of the belt end fitting device by the spring drive when the seatback is unlocked and/or is pivoted forward in the direction of travel.

In another further embodiment, the seat-side release element may be connected to the seatback or to a seat-side unlocking device that is configured to enable the seatback to pivot.

In another further embodiment, the locking device and the release element may form a mechanism.

In another further embodiment, the release element may be formed by a release lever that is connected to the seatback or to the seat-side unlocking device. Further, the locking device of the belt end fitting device may be configured to be unlocked by the release lever when the seatback is pivoted or is unlocked for pivoting.

In another further embodiment, the belt end fitting device may include a belt-tensioning device with which the seatbelt is tensioned in the event of an accident.

In another further embodiment, the belt-tensioning device may include a gas generator and a tensioning tube that is connected to the gas generator.

In another further embodiment, a tensioning piston, which may be guided in the tensioning tube, may be connected to a belt-connecting device via a tensioning cable. Further, the tensioning piston may tension the tensioning cable and the seatbelt when driven by the gas generator.

In another further embodiment, a first pivot bearing of the belt end fitting device may be arranged at an end of the tensioning tube that is away from the gas generator.

In another further embodiment, a second pivot bearing of the belt end fitting device may be arranged in the vicinity of a deflecting point of the tensioning cable.

In another further embodiment, the second pivot bearing of the belt end fitting device may be arranged in the vicinity of a B-pillar of the vehicle.

In another further embodiment, the belt end fitting device may be mounted behind or under the vehicle seat.

A substantial advantage of the belt end fitting device according to the invention is that it permits optimum accessibility to the rear seat of the vehicle, for example when used in a three-door vehicle. Specifically, the problem associated with conventional belt end fitting devices, which was previously discussed, is avoided in the case of the belt end fitting device according to the invention because the belt end fitting device can be pivoted or folded (if it is in the way) in the direction toward the rear seat when a passenger gets into (or out of) the vehicle.

The belt end fitting device may be designed in such a manner that it can be pivoted or folded from its "normal position" to the vehicle floor. The "normal position" is to be understood as the position of the belt end fitting device during "normal operation" of the vehicle (i.e., when the vehicle is driving). In the "normal position", the seatbelt, which is secured by the belt end fitting device, can be used in the customary manner and employed for buckling a person.

The belt end fitting device may be coupled in such a manner to the seatback of the vehicle seat assigned to the seatbelt that, when the seatback is pivoted, the belt end fitting device is likewise pivoted. In this case, the pivoting movements of the seatback and that of the belt end fitting device may be opposed or in opposite directions. As a result, when the seatback is pivoted forward in the direction of travel, the belt end fitting device may be pivoted rearward.

According to an advantageous refinement of the belt end fitting device, the belt end fitting device may include a spring drive that exerts a pivoting force to pivot the belt end fitting device. The spring drive may have, for example, a torsion spring. Furthermore, the belt end fitting device may be provided with a locking device that locks the belt end fitting device in its "normal position" and that prevents a pivoting of the belt end fitting device by the spring drive.

The locking device may be connected to a release element that unlocks the locking device and that releases a pivoting of the belt end fitting device when the seatback of the vehicle seat is unlocked and/or is pivoted forward in the direction of travel. The release element can be connected, for example, indirectly or directly to the seatback or else to a seat-side unlocking device that enables the seatback to pivot. To couple the belt end fitting device and the seatback, the locking device and the release element can form a mechanism, for example. As an alternative, the release element may also be formed, for example, by a release lever that is connected to the seatback or to the seat-side unlocking device of the seatback; the release lever may unlock the locking device of the belt end fitting device when the seatback is pivoted or is unlocked for pivoting.

It is regarded as particularly advantageous if the belt end fitting device includes a belt-tensioning device with which the seatbelt may be tensioned in the event of an accident. The belt-tensioning device may have a gas generator and a tensioning tube that is connected to the gas generator. A tensioning piston, for example, may be guided in the tensioning tube. Further, the tensioning piston may be connected to a belt-connecting device of the belt end fitting device via a tensioning cable and may tension the tensioning cable and the seatbelt, when driven by the gas generator.

A first pivot bearing for pivoting the belt end fitting device may be arranged at an end of the tensioning tube that is away from the gas generator. A second pivot bearing of the belt end fitting device may be arranged, for example, in the vicinity of a deflecting point of the tensioning cable.

The belt end fitting device may be fitted in the direct vicinity of the vehicle seat, e.g., behind or under the seat. For example, the belt end fitting device may be arranged directly on the vehicle seat, so that it is moved when the vehicle seat is displaced. As an alternative, the belt end fitting device may also be arranged on the vehicle body. Moreover, the belt end fitting device's second bearing point, which is arranged in the vicinity of the deflecting point of the tensioning cable, may then be situated in the vicinity of the B-pillar of the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and FIG. 1, which is a perspective view of an embodiment of a belt end fitting device according to the present invention.

DETAILED DESCRIPTION

An embodiment of the present invention will be described with reference to the FIG. 1. Like numbers are used throughout the drawing to refer to the same or similar parts.

The passenger's side 10 of a motor vehicle can be seen in FIG. 1. A passenger's seat 20, which is fitted with a seatback 30, is arranged on the passenger's side 10. In addition, the FIGURE shows an outer wall 40 of the vehicle on the passenger's side 10 along with a B-pillar 50.

A belt end fitting device 60, which forms an "end fitting tensioner", is fitted directly behind or below the passenger's seat 20. The belt end fitting device 60 has a belt-connecting device 70 (or "anchor") to which a seatbelt (not illustrated in FIG. 1) of the passenger's seat 20 is secured. The belt-connecting device 70 fixedly engages an end of the seatbelt that is away from a seatbelt retractor (likewise not illustrated in FIG. 1 for reasons of clarity).

In addition to the belt-connecting device 70, the belt end fitting device 60 also includes a belt-tensioning device 80 that directly interacts with the belt-connecting device 70. The belt-tensioning device 80 is used specifically, in the event of an accident, to pull the belt-connecting device 70 downward in the arrow direction P, i.e. in the direction of the vehicle floor, thereby tensioning the seatbelt.

The belt-tensioning device 80 may include a gas generator 90 and a tensioning tube 100, which is connected to the gas generator. A tensioning piston 110, which is connected to the belt-connecting device 70 via a tensioning cable 120, is indicated schematically in FIG. 1 in the tensioning tube 100. The tensioning cable 120 may be deflected by means of a deflecting point (or deflecting member) 130. To tension or to pull down the belt-connecting device 70, the tensioning piston 110 may be deflected by means of the gas generator 90 to a distal end 200 of the tensioning tube 100, i.e., the end that is away from the gas generator 90.

As previously discussed, it is well known that, when getting into (when entering the vehicle) or out of (when exiting the vehicle) the rear seat of a three-door vehicle, a passenger must enter/exit via the front door. To facilitate this movement, the seatback 30 of the particular front seat is typically folded forward in the direction of travel, i.e., in the direction of arrow S1. When the seatback 30 is folded, the belt end fitting device 60 is correspondingly (and automatically) pivoted in the opposite direction, i.e., in the direction of arrow S2.

In other words, the pivoting movement of the seatback 30 and that of the belt end fitting device 60 are coupled. Specifically, when the seatback 30 is pivoted forward in the direction of travel, the belt end fitting device 60 is automatically pivoted rearward. This dual (and opposite) rotation facilitates a passenger's ability to get into (when entering the vehicle) or out of (when exiting the vehicle) the rear seat of the vehicle, by moving the seatbelt to which the belt-connecting device 70 is connected out of the typical path of the entering/exiting passenger.

To permit a pivoting of the belt end fitting device 60, the belt end fitting device 60 has a bearing 210 that is arranged in the vicinity of the end 200 of the tensioning tube 100 and that is secured on the inside of the vehicle. A second bearing 220 is provided in the vicinity of the deflecting point 130 of the tensioning cable 120, i.e., in the vicinity of the outer wall 40 on the passenger's side and, more specifically, in the vicinity of the B-pillar 50.

To permit an automatic pivoting of the belt end fitting device 60, the belt end fitting device 60 has a spring drive 400 that is pretensioned in such a manner that it always exerts a pivoting force on the belt end fitting device 60. In normal operation, the belt end fitting device 60 is locked in its "normal position", to avoid an undesirable pivoting of the belt end fitting device 60. For this purpose, the belt end fitting device 60 is also equipped with a locking device 500 that locks the spring drive 400 or the belt end fitting device 60 in its normal position and that prevents a pivoting of the belt end fitting device 60. The locking device 500 is connected to a seat-side release element 600 that unlocks the locking device 500 and that releases a pivoting of the belt end fitting device 60 (by the spring drive 400), when the seatback 30 is unlocked and/or is pivoted forward in the direction of travel. The release element 600 may be fitted, for example, to the seatback 30 or else may be connected to a seat-side seatback-unlocking mechanism.

When the locking device 500 is unlocked, the spring drive 400 can release the pivoting movement of the belt end fitting device 60. As a result, the belt end fitting device 60 pivots in such a manner that the belt-connecting device 70 is pivoted rearward and downward onto the vehicle floor.

The locking device 500 and the release element 600 can jointly form a mechanism that controls the coupling between the pivoting movements of the seatback 30 and the belt end fitting device 60. As an alternative, the release element 600 can be formed by a release lever, which is connected to the seatback 30 or to the seat-side unlocking device and with which the locking device of the belt end fitting device 60 is unlocked, when the seatback 30 is pivoted or is at least unlocked. For this purpose, the locking device 500 may have, for example, a stop that interacts with the release lever.

The priority application, German Application No. 10 2004 041 810.1, which was filed on Aug. 26, 2004, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. The scope of the present invention is to be defined as set forth in the following claims.

What is claimed is:

1. A belt end fitting device for securing a seatbelt, wherein the belt end fitting device is pivotably or foldably mounted at a location on a vehicle body or a vehicle seat,
   wherein the belt end fitting device is configured to pivot at the mount location from a predetermined normal position in the direction of the vehicle floor,
   wherein the belt end fitting device comprises a spring drive that exerts a pivoting force to pivot the belt end fitting device,
   wherein the spring drive comprises a torsion spring,
   wherein the belt end fitting device comprises a locking device that is configured to lock the belt end fitting device in its predetermined normal position and that is configured to prevent a pivoting of the belt end fitting device by the spring drive,
   wherein the belt end fitting device is coupled in such a manner to a seatback of the vehicle seat that, when the seatback is pivoted, the belt fitting device also pivots automatically.

2. A belt end fitting device for securing a seatbelt, wherein the belt end fitting device is pivotably or foldably mounted at a location on a vehicle body or a vehicle seat,
   wherein the belt end fitting device is coupled in such a manner to a seatback of the vehicle seat that, when the seatback is pivoted, the belt fitting device also pivots automatically,
   wherein the pivoting movements of the belt end fitting device and that of the seatback are in opposite directions.

3. The belt end fitting device as claimed in claim 2, wherein the belt end fitting device and the seatback are coupled in such a manner that, when the seatback is pivoted forward in the direction of travel, the belt end fitting device automatically pivots rearward.

4. A belt end fitting device for securing a seatbelt, wherein the belt end fitting device is pivotably or foldably mounted at a location on a vehicle body or a vehicle seat,
   wherein the belt end fitting device is configured to pivot at the mount location from a predetermined normal position in the direction of the vehicle floor,
   wherein the belt end fitting device comprises a spring drive that exerts a pivoting force to pivot the belt end fitting device,
   wherein the spring drive comprises a torsion spring,
   wherein the belt end fitting device comprises a locking device that is configured to lock the belt end fitting device in its predetermined normal position and that is configured to prevent a pivoting of the belt end fitting device by the spring drive,
   wherein the locking device is connected to a seat-side release element that is configured to unlock the locking device and that is configured to release a pivoting of the belt end fitting device by the spring drive when the seatback is unlocked and/or is pivoted forward in the direction of travel.

5. The belt end fitting device as claimed in claim 4, wherein the seat-side release element is connected to the seatback or to a seat-side unlocking device that is configured to enable the seatback to pivot.

6. The belt end fitting device as claimed in claim 4, wherein the locking device and the release element form a mechanism.

7. The belt end fitting device as claimed in claim 4, wherein the release element is formed by a release lever that is connected to the seatback or to the seat-side unlocking device, and wherein the locking device of the belt end fitting device is configured to be unlocked by the release lever when the seatback is pivoted or is unlocked for pivoting.

8. A belt end fitting device for securing a seatbelt, wherein the belt end fitting device is pivotably or foldably mounted at a location on a vehicle body or a vehicle seat,
   wherein the belt end fitting device comprises a belt-tensioning device with which the seatbelt is tensioned in the event of an accident,
   wherein the belt-tensioning device comprises a gas generator and a tensioning tube that is connected to the gas generator,
   wherein a tensioning piston, which is guided in the tensioning tube, is connected to a belt-connecting device via a tensioning cable, and wherein the tensioning piston tensions the tensioning cable and the seatbelt when driven by the gas generator.

9. The belt end fitting device as claimed in claim 8, wherein a first pivot bearing of the belt end fitting device is arranged at an end of the tensioning tube that is away from the gas generator.

10. The belt end fitting device as claimed in claim 9, wherein a second pivot bearing of the belt end fitting device is arranged in the vicinity of a deflecting point of the tensioning cable.

11. The belt end fitting device as claimed in claim 10, wherein the second pivot bearing of the belt end fitting device is arranged in the vicinity of a B-pillar of the vehicle.

* * * * *

UNITED STATES PATENT AND TRADEMARK OFFICE
CERTIFICATE OF CORRECTION

PATENT NO. : 7,614,660 B2  Page 1 of 1
APPLICATION NO. : 11/209039
DATED : November 10, 2009
INVENTOR(S) : Glinka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Nineteenth Day of October, 2010

David J. Kappos
*Director of the United States Patent and Trademark Office*